United States Patent
Bhardwaj

[11] Patent Number: 5,942,686
[45] Date of Patent: Aug. 24, 1999

[54] RATIOMETRIC TRANSDUCER AND METHOD

[75] Inventor: Pradeep Bhardwaj, Danville, Calif.

[73] Assignee: BEI Electronics, Inc., San Francisco, Calif.

[21] Appl. No.: 08/306,766

[22] Filed: Sep. 15, 1994

[51] Int. Cl.[6] ............................................. G01P 9/04
[52] U.S. Cl. ........................ 73/504.16; 73/504.04; 73/514.15; 310/316
[58] Field of Search ................. 73/505, 1 D, 1 DV, 73/510, 517 R, 517 A, 517 B; 310/316, 317, 370, 329

[56] References Cited

U.S. PATENT DOCUMENTS

| 4,674,331 | 6/1987 | Watson | 73/505 |
| 4,884,446 | 12/1989 | Ljung | 73/505 |
| 4,930,351 | 6/1990 | Macy et al. | 73/505 |
| 5,014,554 | 5/1991 | Terada et al. | 73/505 |
| 5,216,315 | 6/1993 | Terada et al. | 73/505 |
| 5,343,749 | 9/1994 | Macy | 73/505 |
| 5,426,970 | 6/1995 | Florida et al. | 73/1 D |

Primary Examiner—Hezron Williams
Assistant Examiner—Helen C. Kwok
Attorney, Agent, or Firm—Flehr Hohbach Test Albritton & Herbert LLP

[57] ABSTRACT

Ratiometric transducer and method in which the outputsnal is linearly proportional to the supply voltage or level of excitation. A drive circuit applies a drive signal to an element which undergoes a change in accordance with a condition to be monitored (e.g., rotation or acceleration), and a pickup circuit receives signals from the element and provides an output signal corresponding to the condition to be monitored. Operating voltage is supplied to the drive circuit from a power supply, and the gain of the drive circuit is adjusted in accordance with variations in the operating voltage to make the drive signal and the output signal proportional to the operating voltage.

10 Claims, 2 Drawing Sheets

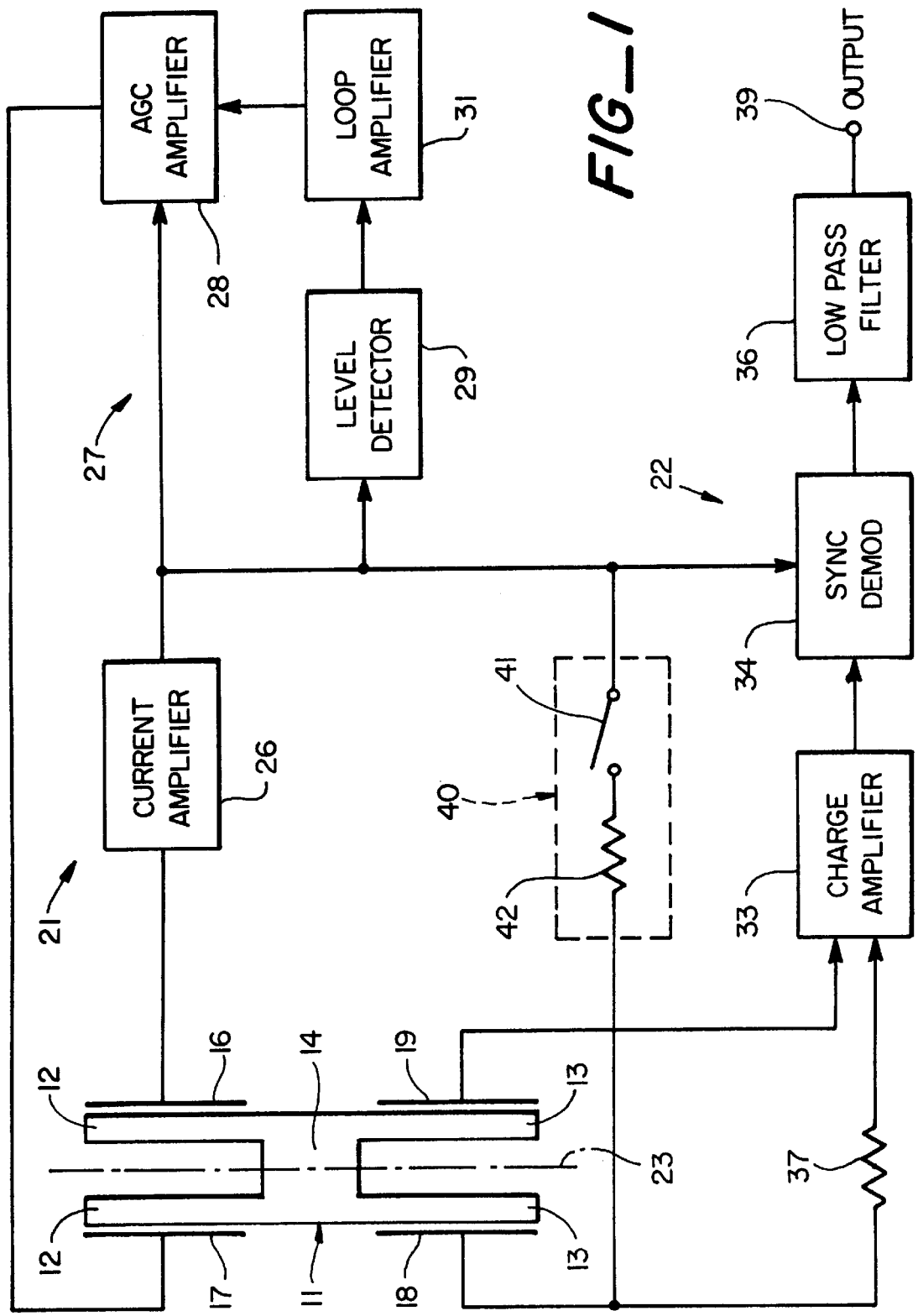
FIG_1

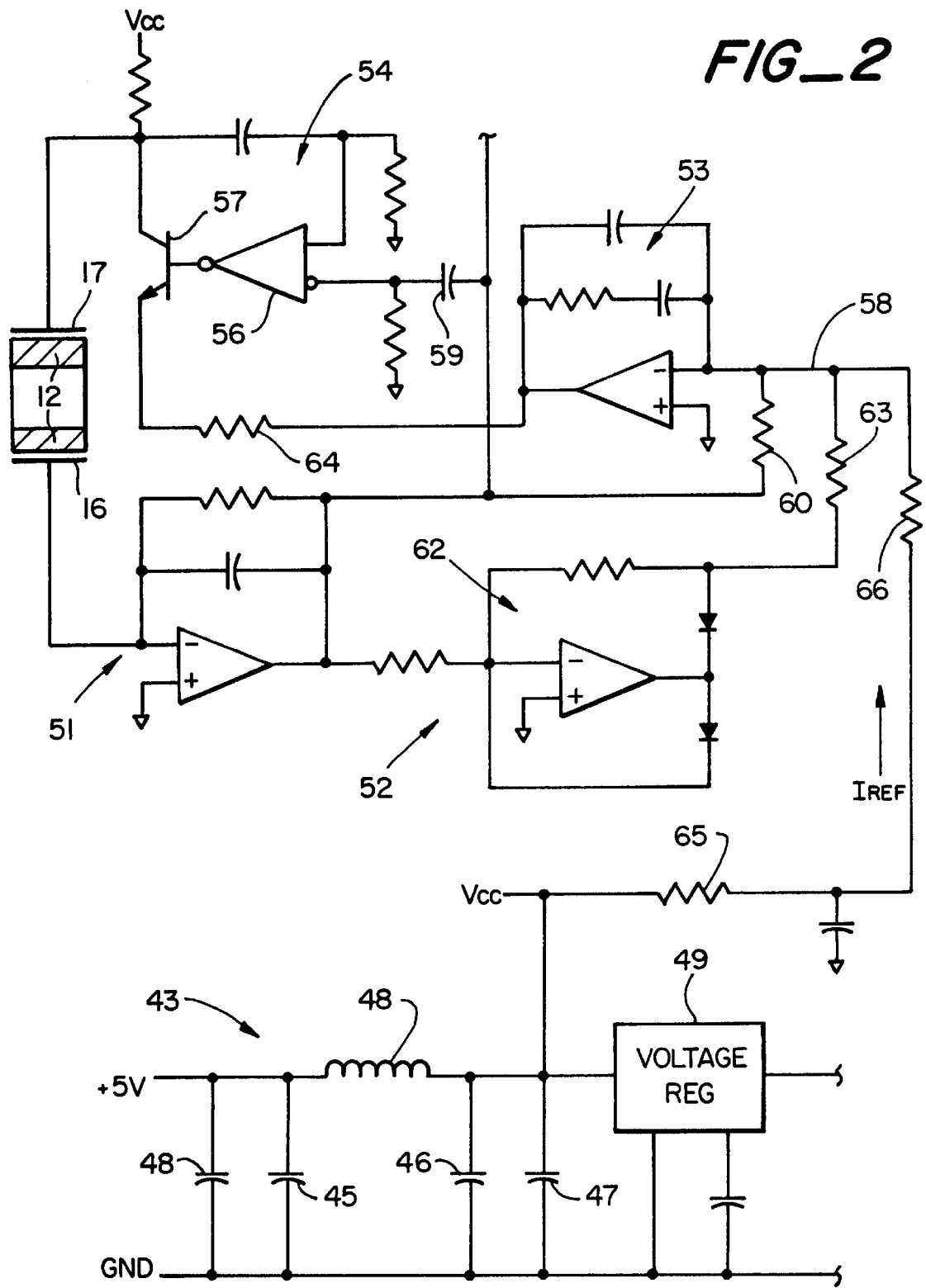
FIG_2

RATIOMETRIC TRANSDUCER AND METHOD

BACKGROUND OF THE INVENTION

1. Field of the Invention

This invention pertains generally to transducers such as rotation rate sensors and inertial sensors and, more particularly, to a transducer system and method in which the output voltage is linearly proportional to the power supply voltage.

2. Related Art

Transducers such as rotation rate sensors, accelerometers and other inertial sensors are used in a wide variety of applications such as control systems employed in aircraft, automobiles and other vehicles. One early type of accelerometer had a potentiometer with an adjustable element or wiper driven by a proofmass to vary the resistance of the poterniometer. That type of accelerometer was a ratiometric device in that the output voltage was linearly proportional to the supply voltage as long as the potentiometer itself was linear.

More recently, accelerometers, rate sensors and other transducers have employed vibrating quartz sensing elements which are substantially more sensitive than potentiometric devices. Unfortunately, however, prior to the present invention, It has not been possible to obtain a ratiometric output from a vibrating quartz device.

OBJECTS AND SUMMARY OF THE INVENTION

It is in general an object of the invention to provide a new and improved transducer and method.

Another object of the invention is to provide a transducer and method of the above character which overcome limitations and disadvantages of the prior art.

These and other objects are achieved in accordance with the invention by providing a ratiometric transducer and method in which the output signal is linearly proportional to the supply voltage or level of excitation. A drive circuit applies a drive signal to an element which undergoes a change in accordance with a condition to be monitored (e.g., rotation or acceleration), and a pickup circuit receives signals from the element and provides an output signal corresponding to the condition to be monitored. Operating voltage is supplied to the drive circuit from a power supply, and the gain of the drive circuit is adjusted in accordance with variations in the operating voltage to make the drive signal and the output signal proportional to the operating voltage

BRIEF DESCRIPTION OF THE DRAWINGS

FIG. 1 is a block diagram of one embodiment of a ratiometric transducer incorporating the invention.

FIG. 2 is a circuit diagram of an AGC controlled drive circuit for use in the embodiment of FIG. 1.

DETAILED DESCRIPTION

In the drawings, the invention is illustrated in connection with a rotation rate sensor of a type which is sometimes referred to as a "quartz rate sensor". However, it is equally applicable to accelerometers, other types of rate sensors, and other types of transducers from which a ratiometric output is desired.

The rate sensor illustrated in FIG. 1 is in many respects similar to a rate sensor shown in copending application Ser. No. 08/100,759, Filed Aug. 2, 1993 now U.S. Pat. No. 5,426,970. It has a double ended tuning fork 11 fabricated of a piezoelectric material such as quartz. The tuning fork has a pair of drive tines 12 and a pair of pickup tines 13 extending in opposite directions from a central body or base 14, with drive electrodes 16, 17 and pickup electrodes 18, 19 on the tines for coupling signals to and from the piezoelectric structure. For ease of illustration, only two drive electrodes and two pickup electrodes are shown in FIG. 1, and they are shown schematically. In an actual tuning fork, however, a greater number of electrodes is generally employed, and in the example illustrated in Ser. No. 08/100,759, two pairs of drive electrodes and two pairs of pickup electrodes are employed.

A drive circuit 21 is connected to the drive electrodes, and a pickup circuit 22 is connected to the pickup electrodes. When the tuning fork is rotated about its longitudinal axis 23, Coriolis forces having a frequency corresponding to the rate of rotation produce a torsioning of the drive tines. That torsioning is transmitted through the piezoelectric structure to the pickup tines, and the signal coupled to the pickup electrodes varies in amplitude at the drive frequency in accordance with the rate of rotation.

The drive circuit is an oscillator with automatic gain control (AGC) which comprises a current amplifier 26 and an AGC loop 27. The AGC loop includes an AGC amplifier 28, a level detector 29 and a loop amplifier/filter 31. The input of current amplifier 26 is connected to "drive low" electrode 16, the output of the current amplifier is connected to the input of the AGC amplifier 28, and the output of the AGC amplifier is connected to "drive high" electrode 17. The signal at the output of current amplifier 26 is a sine wave. Level detector 29 converts the peak of the sine wave amplitude to an equivalent RMS value, and the output of the level detector is compared to a reference current. The error or difference between the reference and the output of the level detector is amplified by loop filter/amplifier 31 and applied to the control input of AGC amplifier 28 to control the gain of the AGC amplifier.

The pickup circuit is illustrated as including a charge amplifier 33, a synchronous demodulator 34, and a low pass filter 36. "Pickup low" electrode 18 is connected to one input of the charge amplifier through a relatively small (e.g., 100 ohm) resistor 37, and "pickup highs" electrode 19 is connected to a second input of the charge amplifier. The signal from the charge amplifier is demodulated in accordance with the signal from current amplifier 26 in the drive circuit, and after filtering to remove high frequency components, the demodulated signal is delivered to an output terminal 39.

The system shown in FIG. 1 and in Ser. No. 08/100,759 also includes a test circuit 40 which permits an attenuated signal from the drive circuit to be applied to the input of the pickup circuit through resistor 37 for testing of the system. The test circuit includes a normally open switch 41 and an attenuator 42 connected in series between the output of current amplifier 26 and the input side of resistor 37.

The invention differs from the system disclosed in Ser. No. 08/100,759 in that supply voltage ($V_{cc}$) is now used as a reference voltage for the AGC circuit, so that the system has a ratiometric output wherein both the drive signal and the output signal are linearly proportional to the supply voltage. The scale of the system now moves up and down with the supply voltage, and there is no need for dead zones at the ends of the scale. A user can use his own A/D converter with its own power supply as the reference voltage, and the A/D converter will read out a "pure rates" in digital format regardless of the supply voltage. This represents a substantial improvement over systems such as the one shown in Ser. No. 08/100,759 where the reference for the AGC circuit is a fixed voltage.

As illustrated in FIG. 2, the system has a power supply 43 which provides the operating voltage $V_{cc}$ for drive and pickup circuits. The power supply includes a filter consisting of capacitors 44–47 and a choke 48, with the voltage $V_{cc}$ being taken from the output side of the choke. A voltage regulator 49 provides a regulated voltage for other portions of the system.

In this embodiment, the AGC controlled drive circuit includes a current amplifier 51, a full-wave rectifier 52, an integrator 53 and a comparator/multiplier 54, the latter comprising an amplifier 56 and a transistor 57 having its base connected to the output of the amplifier. A summing node 58 is provided at the input of the integrator.

The "drive low" electrode 16 on the tuning fork is connected to the input of current amplifier 51, and the output of the current amplifier is connected to the input of comparator amplifier 56 through a coupling capacitor 59. The output of the comparator/multiplier, taken at the collector of transistor 57 is connected to the "drive highs" electrode 17 on the tuning fork.

Current from current amplifier 51 is also rectified and applied to summing node 58 as a full-wave rectified negative current. In this regard, a first resistor 60 is connected between the output of the current amplifier and the summing node 58, and a second resistor 61 is connected between the output of the current amplifier and the input of a half-wave rectifier 62. A resistor 63 is connected between the output of the half-wave rectifier and the summing node. The current through resistor 60 is a sine wave, and the current through resistor 63 is a negative going half-wave rectified sine wave. By making resistor 60 twice the value of resistor 63, the amplitude of the current through resistor 60 is one half the amplitude of the current through resistor 63, and these two currents add together to produce a negative full-wave rectified current having the same amplitude as the half-wave rectified current. The output of integrator 53 is connected to the emitter of multiplier transistor 57 by a resistor 64 to control the level of the drive signal.

A reference current $I_{REF}$ proportional to the supply voltage $V_{cc}$ is applied to the summing node through resistors 65, 66 for combination with the currents from the full-wave rectifier. This is a marked departure from systems previously provided in which the reference for the AGC circuit is a constant current obtained from a constant voltage source, e.g. by connecting resistor 66 to a Zener diode or other constant voltage source.

Operation and use of the embodiment of FIG. 2, and therein the method of the invention, are as follows. A drive voltage is applied to "drive high" electrode 17 by comparator/multiplier 54, with the level of the drive voltage being controlled by the output of integrator 53. Current from the "drive low" electrode 17 is amplified by current amplifier 51 to provide a voltage of sinusoidal waveform which is proportional to the drive current. This voltage is rectified by full-wave rectifier 52 to provide an inverted or negative current which is applied to the summing node through resistors 60, 63. At the summing node, those two currents are combined with the reference current $I_{REF}$ which is supplied to the node through resistor 66 and is proportional to the supply voltage $V_{cc}$. At the stable operating point, the net current into the summing node and integrator is zero. That condition is met when the negative net current from the full-wave rectifier is equal to the reference current.

The comparator/multiplier converts the sinusoidal voltage from current amplifier 51 to a square wave, with an amplitude controlled by output of the integrator. That output is, to a large extent, dependent upon the supply voltage, and the drive current applied to the tuning fork is thus proportional to the supply voltage. The current coupled to the pickup circuit corresponds closely to the drive current, and with the supply voltage providing the reference for the AGC circuit, the output voltage from the pickup circuit is linearly proportional to the supply voltage.

In the event that the drive current should start to drift due to something other than a change in the supply voltage, the AGC action will oppose the change and return the drive current to its preset level by altering the drive voltage appropriately. If, for example, the drive current should start to increase, the current supplied to the summing node from the full-wave rectifier will start to increase, resulting in a net negative current into the summing node. This results in an increase in voltage at the output of the integrator, thus reducing the drive current control voltage, and hence the drive current itself, until the net current into the summing node at the integrator returns to zero. If however, the supply voltage should change, the reference current $I_{REF}$ will change in proportion to it, and the output of the integrator will follow that change. The drive voltage applied to the tuning fork will change accordingly, and the drive current will remain proportional to the supply voltage. The currents supplied to the summing node by full-wave rectifier 52 will adjust to maintain a zero net current Into the integrator with the new level of reference current.

Although the invention has been described with specific reference to a rate sensor having a tuning fork fabricated of piezoelectric or quartz material, it is equally applicable to other types of transducers and other types of vibratory elements. It could, for example, be utilized in a rate sensor or other transducer having a vibratory silicon sensor which is electrostatically actuated and capacitively sensed.

The invention has a number of important features and advantages. The system has a ratiometric output, with both the drive current and the output signal being linearly proportional to the supply voltage. The scale of the system moves up and down with the supply voltage and there is no need for dead zones at the ends of the scale. A user can use his own A/D converter with its power supply voltage as a reference voltage, and the A/D converter will read out in pure rate in digital format regardless of the supply voltage.

It is apparent from the foregoing that a new and improved ratiometric transducer and method have been provided. While only certain presently preferred embodiments have been described in detail, as will be apparent to those familiar with the art, certain changes and modifications can be made without departing from the scope of the invention as defined by the following claims.

I claim:

1. In an inertial transducer: a vibratory element, a drive circuit for applying a drive signal to the vibratory element, a pickup circuit coupled to the vibratory element for providing an output signal corresponding to movement of the vibratory element, a power supply for supplying an operating voltage to the drive circuit, and means responsive to the power supply voltage for controlling the drive circuit so that the drive signal and the output signal are proportional to the supply voltage.

2. The transducer of claim 1 wherein the means for controlling the drive circuit comprises an automatic gain control (AGC) circuit, and the supply voltage is applied to a control element of the AGC circuit.

3. In a transducer: means including a pickup circuit responsive to a condition to be monitored for providing an output signal corresponding to that condition, a drive circuit for providing a drive signal which stimulates a response in the pickup circuit which varies in accordance with the condition to be monitored, a power supply for supplying operating voltage to the drive circuit, and means responsive to the power supply voltage for controlling the drive circuit so that drive signal and the output signal are proportional to the supply voltage.

4. The transducer of claim 3 wherein the means for controlling the drive circuit comprises an automatic gain control (AGC) circuit, and the supply voltage is applied to a control element of the AGC circuit.

5. In a transducer for monitoring rotation: a tuning fork, a drive circuit coupled to the tuning fork for applying a drive signal to the tuning fork to cause vibration of the tuning fork, a pickup circuit responsive to signals produced by vibration of the tuning fork for providing an output signal corresponding to rotation of the tuning fork, a power supply for supplying operating voltage to the drive circuit, an automatic gain control in the drive circuit for controlling the level of the drive signal, and means for applying the operating voltage to the gain control as a control signal to make the level of the drive signal and the output signal proportional to the operating voltage.

6. In a method of monitoring inertial activity, the steps of: applying a drive signal from a drive circuit to a vibratory element which is subjected to an inertial force, monitoring signals from the vibratory element with a pickup circuit to provide an output signal corresponding to the inertial force, supplying operating voltage to the drive circuit from a power supply, and controlling the drive circuit in accordance with the operating voltage so that the drive signal and the output signal are proportional to the operating voltage.

7. The method of claim 6 wherein the drive circuit is controlled by controlling the gain of the drive circuit in accordance with the operating voltage.

8. In a method of providing an output signal which is proportional to level of excitation, the steps of: monitoring a condition with a pickup circuit to provide an output signal corresponding to the condition, operating a drive circuit to provide a drive signal which stimulates a response in the pickup circuit which varies in accordance with the condition to be monitored, supplying an operating voltage from a power supply to the drive circuit, and controlling the drive circuit in accordance with the operating voltage so that the drive signal and the output signal are proportional to the operating voltage.

9. The method of claim 8 wherein the drive circuit is controlled by controlling the gain of the drive circuit in accordance with the operating voltage.

10. In a method of monitoring rotation, the steps of: applying a drive signal from a drive circuit to a tuning fork to cause vibration of the tuning fork, monitoring signals produced by vibration of the tuning fork with a pickup circuit to provide an output signal corresponding to rotation of the tuning fork, supplying an operating voltage to the drive circuit, and adjusting gain in the drive circuit in response to changes in the operating voltage to make the level of the drive signal and the output signal proportional to the operating voltage.

* * * * *